United States Patent [19]
Nagano

[11] Patent Number: 6,092,839
[45] Date of Patent: Jul. 25, 2000

[54] METHOD OF FOLDING A BAG FOR AN AIR BAG APPARATUS AND AN AIR BAG APPARATUS INCORPORATING THE BAG

[75] Inventor: Makoto Nagano, Toyota, Japan

[73] Assignee: Toyota Jidosha Kabushiki Kaisha, Toyota, Japan

[21] Appl. No.: 09/024,130

[22] Filed: Feb. 17, 1998

[30] Foreign Application Priority Data

Feb. 21, 1997 [JP] Japan .................................. 9-038172

[51] Int. Cl.⁷ .................................................. B60R 21/16
[52] U.S. Cl. ........................................................ 280/743.1
[58] Field of Search .............................. 280/728.1, 743.1, 280/743.2

[56] References Cited

U.S. PATENT DOCUMENTS

| | | |
|---|---|---|
| 4,004,828 | 1/1977 | Sogabe et al. . |
| 5,482,317 | 1/1996 | Nelsen et al. . |
| 5,605,350 | 2/1997 | Bates et al. . |
| 5,690,358 | 11/1997 | Marotzke . |

FOREIGN PATENT DOCUMENTS

| | | |
|---|---|---|
| 4-278860 | 6/1976 | Japan . |
| 51-068043 | 10/1992 | Japan . |
| 7-137591 | 5/1995 | Japan . |
| 7-277125 | 10/1995 | Japan . |

*Primary Examiner*—Paul N. Dickson
*Attorney, Agent, or Firm*—Oliff & Berridge, PLC

[57] ABSTRACT

A method of folding a bag for an air bag apparatus which is accommodated in a folded state in an apparatus main body, and is deployed and inflated toward a vehicle occupant as an ejected gas flows into the bag on impact of a predetermined high load to a frontal portion of a vehicle, includes: a first step of planarly laying out the bag including two pieces of base cloth which are respectively cut into circular shapes and whose peripheral portions are secured to each other; a second step of folding toward a center of the bag four peripheral edge portions of the bag laid out planarly in the first step, such that the shape of the bag in a plan view becomes a quadrangular shape; and a third step of folding a plurality of times four corner portions formed by folding the bag in the second step, such that the shape of the bag in a plan view becomes a quadrangular shape which is smaller than the quadrangular shape.

24 Claims, 8 Drawing Sheets

METHOD OF FOLDING A BAG FOR AN AIR BAG APPARATUS AND AN AIR BAG APPARATUS INCORPORATING THE BAG

BACKGROUND OF THE INVENTION

1. Field of the Invention

The present invention relates to a method of folding a bag for an air bag apparatus which is accommodated in a folded state in an apparatus main body, and is deployed and inflated toward a vehicle occupant as an ejected gas flows into the bag on impact of a predetermined high load to a frontal portion of a vehicle, as well as an air bag apparatus incorporating the bag.

2. Description of the Related Art

Conventionally, by devising methods for folding bags of air bag apparatuses, attempts have been made to improve the deployment performance of the bags on impact of a predetermined high load to a frontal portion of a vehicle so as to improve the performance of occupant protection. As an example of disclosure of this type of bag folding method, it is possible to cite Japanese Patent Application Laid-Open (JP-A) 7-277125, and a brief description will be given hereinunder of the bag folding method disclosed in this publication.

FIGS. 8A to 8K show the procedure of folding a bag 250 of an air bag apparatus for a driver seat. The bag 250 is formed by sewing together peripheral portions of two pieces of base cloth which are respectively cut into circular shapes.

Figure 8A:
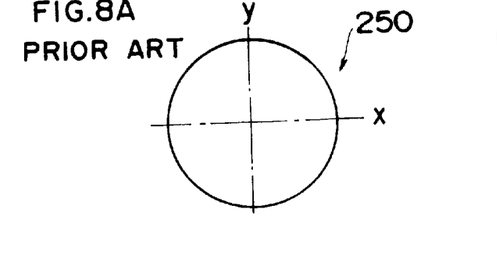
Figure 8B:
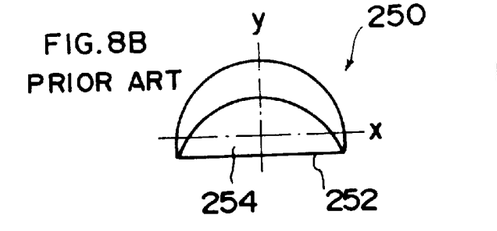
Figure 8C:
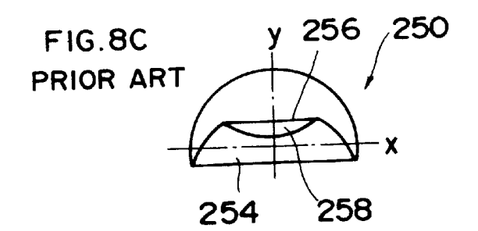
Figure 8D:
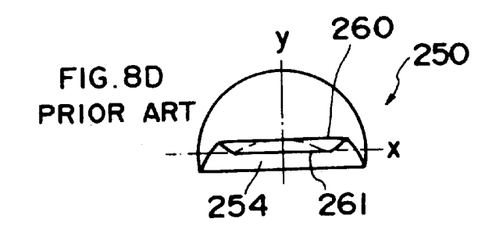
Figure 8E:
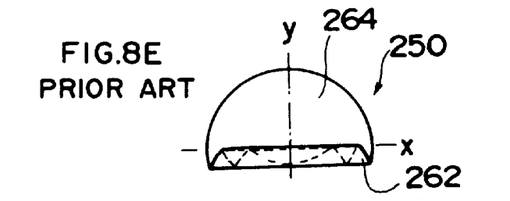
Figure 8F:
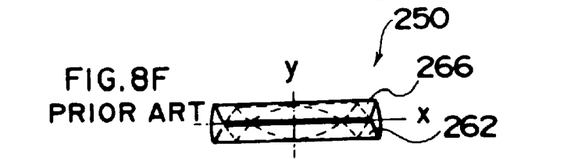

First, as shown in FIG. 8A, the bag 250 is set in a planarly laid-out state. Then, as shown in FIG. 8B, a lower portion 254 of the bag is folded at a folding line 252 which is parallel with a center line X. Then, as shown in FIG. 8C, a distal end portion 258 of the lower portion 254 of the bag is folded back to the opposite side at a folding line 256 which is parallel with the center line X. Then, as shown in FIG. 8D, the distal end side portion of the lower portion 254 of the bag is folded in the same direction at a folding line 260 which is parallel with the center line X. Further, the distal end side portion of the lower portion 254 of the bag is folded in the same direction at a folding line 261 on the center line X. As a result, a lower foldedup portion 262 is formed as shown in FIG. 8E. Subsequently, an upper portion 264 of the bag is also folded in a procedure similar to the one described above. Consequently, an upper folded-up portion 266 is formed in such a manner as to be symmetrical with the lower folded-up portion 262 with respect to the line X.

Figure 8G:
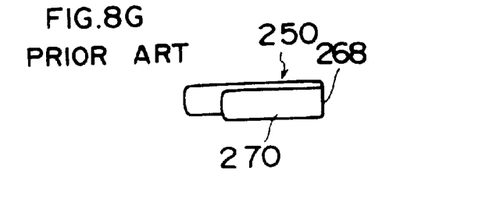
Figure 8H:
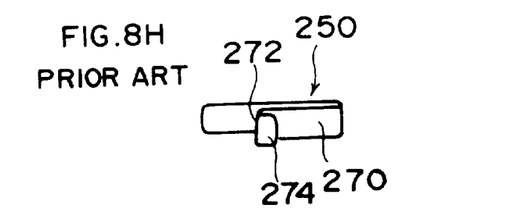
Figure 8I:
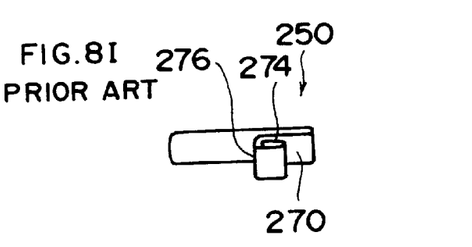
Figure 8J:
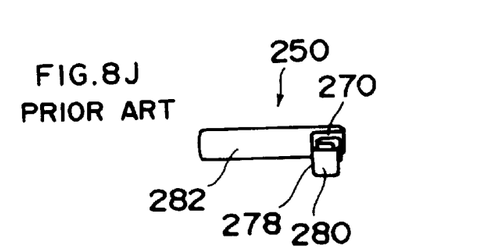

Next, as shown in FIG. 8G, a right-hand portion 270 of the bag is folded at a folding line 268 which is parallel with a center line Y. Then, as shown in FIG. 8H, a distal end portion 274 of the right-hand portion 270 of the bag is folded back at a folding line 272 which is parallel with the center line Y. Then, as shown in FIG. 8I, the distal end side portion of the right-hand portion 270 of the bag is folded in the same direction at a folding line 276 which is parallel with the center line Y. Then, as shown in FIG. 8J, the distal end side portion of the right-hand portion 270 of the bag is further folded in the same direction at a folding line 278 which is parallel with the center line Y. As a result, a right folded-up portion 280 is formed. Subsequently, a left-hand portion 282 of the bag is also folded in a procedure similar to the one described above. Consequently, a left folded-up portion 284 is formed in such a manner as to be symmetrical with the right folded-up portion 280 with respect to the line Y.

Figure 8K:
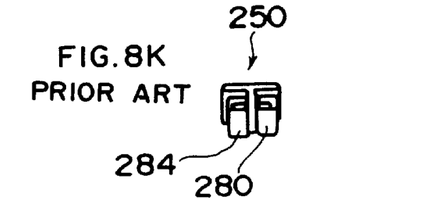

Namely, with the above-described folding method, the bag 250 is first folded in the vertical direction by using the center line X as a reference to form the lower folded-up portion 262 and the upper folded-up portion 266 which are belt-shaped. Then, the bag 250 is folded in the horizontal direction by using the center line Y as a reference to form the right folded-up portion 280 and the left folded-up portion 284 which are rectangular in a plan view. At this time, in both procedures of forming the folded-up portions, the bag 250 is folded in the same direction in the second and subsequent foldings. As a result, when the bag 250 is inflated, the right folded-up portion 280 and the left folded-up portion 284 are first unfolded in the horizontal direction, the lower folded-up portion 262 and the upper folded-up portion 266 are then unfolded in the vertical direction, and the overall bag 250 is subsequently inflated toward the occupant. Accordingly, the arrangement provided is such that the bag 250 is unfolded in the horizontal direction and then in the vertical direction in an early stage of inflation.

Conceivably, such a method of folding the bag 250 and, hence, the manner of deployment of the bag 250 in the early stage of inflation are able to obtain their due advantages in light of the performance of occupant protection.

However, in accordance with the above-described arrangement, since the right folded-up portion 280 and the left folded-up portion 284 are first unfolded in the horizontal direction, and the lower folded-up portion 262 and the upper folded-up portion 266 are then unfolded in the vertical direction, one unfolding (unfolding in the vertical direction) is dependent on the other unfolding (unfolding in the horizontal direction). If such dependence can be canceled and the bag can be unfolded in both the vertical direction and the horizontal direction at the same time in the early stage of inflation, it is thought that an optimum state of bag deployment can be obtained, making it possible to further improve the performance of occupant protection.

SUMMARY OF THE INVENTION

In view of the above-described circumstances, it is an object of the present invention to provide a method of folding a bag for an air bag apparatus which is capable of setting the bag in an optimum state of deployment, as well as an air bag apparatus incorporating the bag.

To this end, in accordance with a first aspect of the present invention, there is provided a method of folding a bag for an air bag apparatus which is accommodated in a folded state in an apparatus main body, and is deployed and inflated toward a vehicle occupant as an ejected gas flows into the bag on impact of a predetermined high load to a frontal portion of a vehicle, comprising: a first step of planarly laying out the bag including two pieces of base cloth which are respectively cut into circular shapes and whose peripheral portions are secured to each other; a second step of folding toward a center of the bag four peripheral edge portions of the bag laid out planarly in the first step, such that the shape of the bag in a plan view becomes a quadrangular shape; and a third step of folding a plurality of times four corner portions formed by folding the bag in the second step, such that the shape of the bag in a plan view becomes a quadrangular shape which is smaller than the quadrangular shape.

In accordance with a second aspect of the present invention, there is provided an air bag apparatus comprising: a bag folded in the folding method according to the first aspect of the invention.

In accordance with the first aspect of the present invention, in the first step, the bag including two pieces of base cloth which are respectively cut into circular shapes and whose peripheral portions are secured to each other is laid out planarly. Then, in the second step, the four peripheral edge portions of the bag laid out planarly in the first step are folded toward the center of the bag, the four peripheral edge portions being spaced apart at 90-degree intervals. As a result, the shape of the bag in a plan view becomes a quadrangular shape. Then, in the third step, the respective four corner portions formed by folding the bag in the second step are folded a plurality of times. Hence, the shape of the bag in a plan view becomes a quadrangular shape which is smaller than the quadrangular shape formed in the second step.

Here, in the present invention, since, in the third step, the four corner portions of the bag formed into the quadrangular shape in a plan view through the second step can be respectively folded a plurality of times independently, it is possible to avoid completely or as much as possible a situation in which, when a certain corner portion is folded, an end of a portion folded from an adjacent corner portion is folded in an overlapping manner. In other words, the bag can be folded up without causing the portions folded from the respective corner portions to interfere with each other or with practically no interference. Accordingly, it is possible to cancel the dependence at the time when the gas flows into the bag and deploys the bag (i.e., at the time the bag is unfolded). As a result, with the bag folded in the folding method in accordance with the present invention, the portions folded from the four corner portions are respectively unfolded concurrently and independently from the early stage of inflation. Thus, in the early stage of inflation, the bag is unfolded concurrently both in the vertical direction and in the horizontal direction. Consequently, an outstanding advantage is obtained in that the bag can be set in an optimally deploying state in the early stage of inflation.

In accordance with the second aspect of the present invention, since the bag folded in the folding method according to the first aspect of the invention is provided, the air bag apparatus operates in the manner described above. Accordingly, in the early stage of inflation, the bag is unfolded concurrently both in the vertical direction and in the horizontal direction. Consequently, an outstanding advantage is obtained in that the bag can be set in an optimally deploying state in the early stage of inflation.

The above and other objects, features and advantages of the present invention will become more apparent from the following detailed description of the invention when read in conjunction with the accompanying drawings.

BRIEF DESCRIPTION OF THE DRAWINGS

FIG. 1A to FIG. 1I are process diagrams illustrating the method of folding a bag in accordance with a first embodiment;

FIG. 4A to FIG. 4J' are process diagrams illustrating the method of folding the bag in accordance with a second embodiment;

FIG. 5A to FIG. 5G are process diagrams illustrating the method of folding the bag in accordance with a third embodiment;

FIG. 6A to FIG. 6G are process diagrams illustrating the method of folding the bag in accordance with a fourth embodiment;

FIG. 7A to FIG. 7D are process diagrams illustrating the method of folding the bag in accordance with a fifth embodiment; and FIG. 8A to FIG. 8K are process diagrams illustrating the method of folding the bag in accordance with a conventional example.

DESCRIPTION OF THE PREFERRED EMBODIMENTS

Referring now to FIGS. 1A to 1I, FIG. 2, and FIG. 3, a description will be given of a first embodiment of the present invention.

Figure 2:
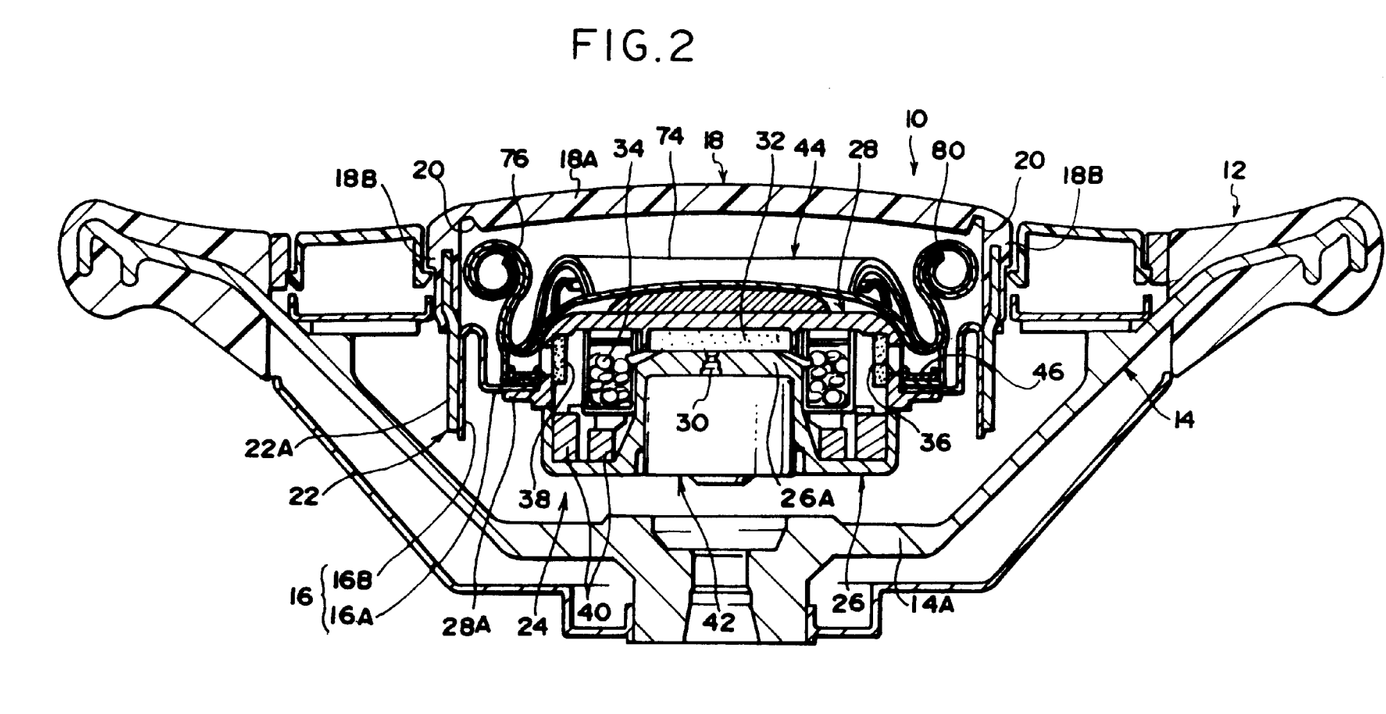
FIG. 2 is a cross-sectional view illustrating an air bag apparatus provided with the bag folded in the folding method illustrated in FIGS. 1A to 1I.
Figure 3:
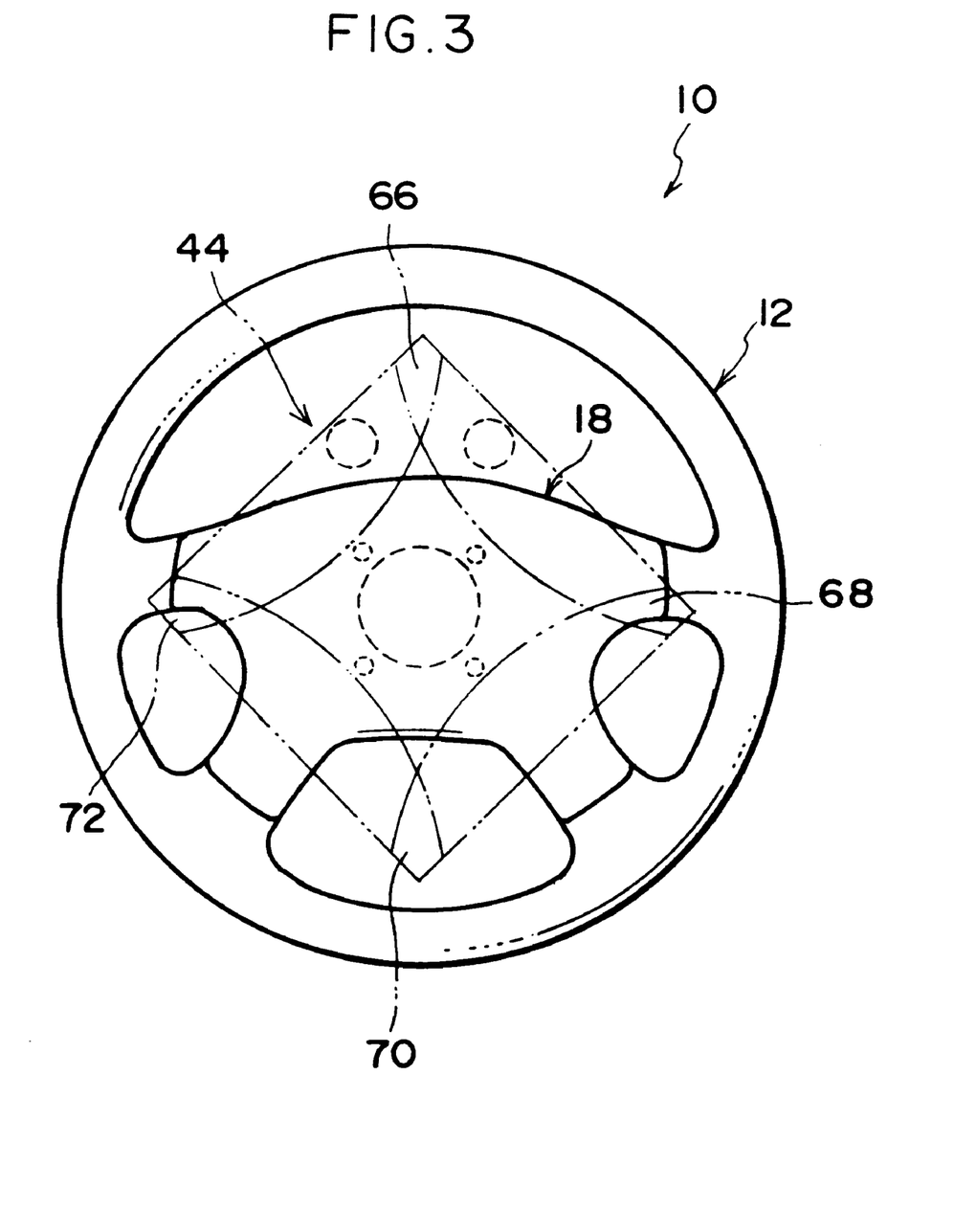
FIG. 3 is an explanatory diagram illustrating the positional relationship of the bag folded in a second step with respect to a steering wheel in the state in which the bag is mounted in a vehicle.

FIG. 2 shows a cross-sectional structure of an air bag apparatus 10 in accordance with this embodiment. As shown in this drawing, the air bag apparatus 10 of this embodiment is disposed in a four-spoke type steering wheel 12.

The air bag apparatus 10 has a high-strength base plate 16 which is fixed to a hub 14A of a core 14 of the steering wheel 12. The base plate 16 is comprised of a base portion 16A in the form of a rectangular flat plate for constituting mounting seat surface, as well as mounting portions 16B which are formed by being bent at ends of the base portion 16A toward a vehicle occupant side and then by being bent again in a direction away from the occupant.

A resin-made wheel pad 18 is disposed on the occupant side of the base plate 16 at a predetermined interval therebetween. The wheel pad 18 has a top wall portion 18A opposing the occupant and a side wall portion 18B which is bent at a peripheral edge of the top wall portion 18A in the direction away from the occupant. In the top wall portion 18A, thin-walled portions 20 are formed which are formed substantially in the H-shape, as viewed from the occupant, and are adapted to be broken as a bag inflating pressure of a predetermined value or greater is applied thereto. In addition, metallic or resin-made insert plates 22 are embedded in the side wall portions 18B by insert molding. It should be noted that portions of the insert plates 22 project from the side wall portions 18B in the direction away from the occupant so as to constitute leg portions 22A for mounting. The wheel pad 18 is fixed to the base plate 16 as the leg portions 22A of the insert plates 22 are held in close contact with the mounting portions 16B of the base plate 16, and the two members are fastened together by unillustrated fixing means (bolts and nuts, rivets, or the like) in this state.

A relatively large-diameter through hole is formed in a central portion of the base portion 16A of the above-described base plate 16, and an occupant-side half of a flat cylindrical inflator 24, which functions as a gas ejecting means, is inserted into the through hole from the hub 14A side. More specifically, the inflator 24 is arranged such that a upper case 28 formed in a cylindrical shape with a bottom is fitted to a lower case 26 formed in a cylindrical shape with a bottom and having its axial portion a protruding portion 26A which protrudes toward the occupant side, and an outer covering of the inflator 24 is formed by welding the seam of the two cases in this state.

An igniter 30 is disposed in the center of the bottom of the protruding portion 26A of the lower case 26. A fire propagating agent 32 is disposed immediately above the igniter 30 in the upper case 28, and a gas generating agent 34 for generating a large volume of gas by burning is sealed around the fire propagating agent 32. In addition, a plurality of gas ejecting holes 36 are formed in a peripheral wall of the upper case 28 at equal intervals, and screens 38 for removing broken fragments of the gas generating agent 34 after burning are disposed on the inner sides of the gas ejecting holes 36. Further, a plurality of coolants 40 for cooling the gas are disposed in gas ejecting passages between the respective screen 38 and the gas generating agent 34.

A sensor 42 which is formed in a substantially cylindrical shape is disposed in the protruding portion 26A of the above-described lower case 26. To illustrate an example of the internal configuration of the sensor 42, the sensor 42 is comprised of a resin-made sensor body which can be split into upper and lower parts; a trigger shaft which is pivotally supported tiltably inside the sensor body; a ball disposed in contact with a distal end of the trigger shaft and adapted to move inertially on impact of a predetermined high load to the front of the vehicle (i.e., at the time of a sudden deceleration of the vehicle); a bypass pin which abuts against an end of the trigger shaft opposite to its end where the ball is disposed, and which is adapted to press the ball via the trigger shaft by an urging force in a direction opposite to the direction of inertial movement; and a firing pin which is retained at the trigger shaft, whose retained state is canceled as the trigger shaft tilts, and which pierces the igniter 30 by the urging force. Although, in this embodiment, an example has been shown in which the inflator 24 is actuated by a mechanical ignition system, the present invention is not limited to the same, and an arrangement may be adopted in which the inflator is actuated by an electric ignition system.

A bag 44 in a folded state is accommodated in a space formed by the base plate 16 and the wheel pad 18 described above. The bag 44 has a circular opening 52 (see FIG. 1A) for insertion of the upper case 28 of the inflator 24, as will be described later. A ring plate 46 is disposed at an inner peripheral edge portion of the opening 52. Stud bolts (not shown) are welded to the ring plate 46, and the peripheral edge portion of the opening 52 of the bag 44 is secured to the base portion 16A of the base plate 16 as nuts (not shown) are threadedly engaged on the stud bolts 44 in a state in which the stud bolts 44 are respectively inserted in bolt insertion holes 54 (see FIG. 1A) formed in the peripheral edge portion of the opening 52 of the bag 44 as well as bolt insertion holes (not shown) formed in a flange 28A of the upper case 28.

In the above-described configuration, the base plate 16, the wheel pad 18, and the insert plates 22 correspond to an "apparatus main body."

Referring now to FIGS. 1A to 1I, a description will be given of a method of folding the above-described bag 44.

Figures 1A, 1B, 1C, 1D, 1E, 1F, 1G, 1H:
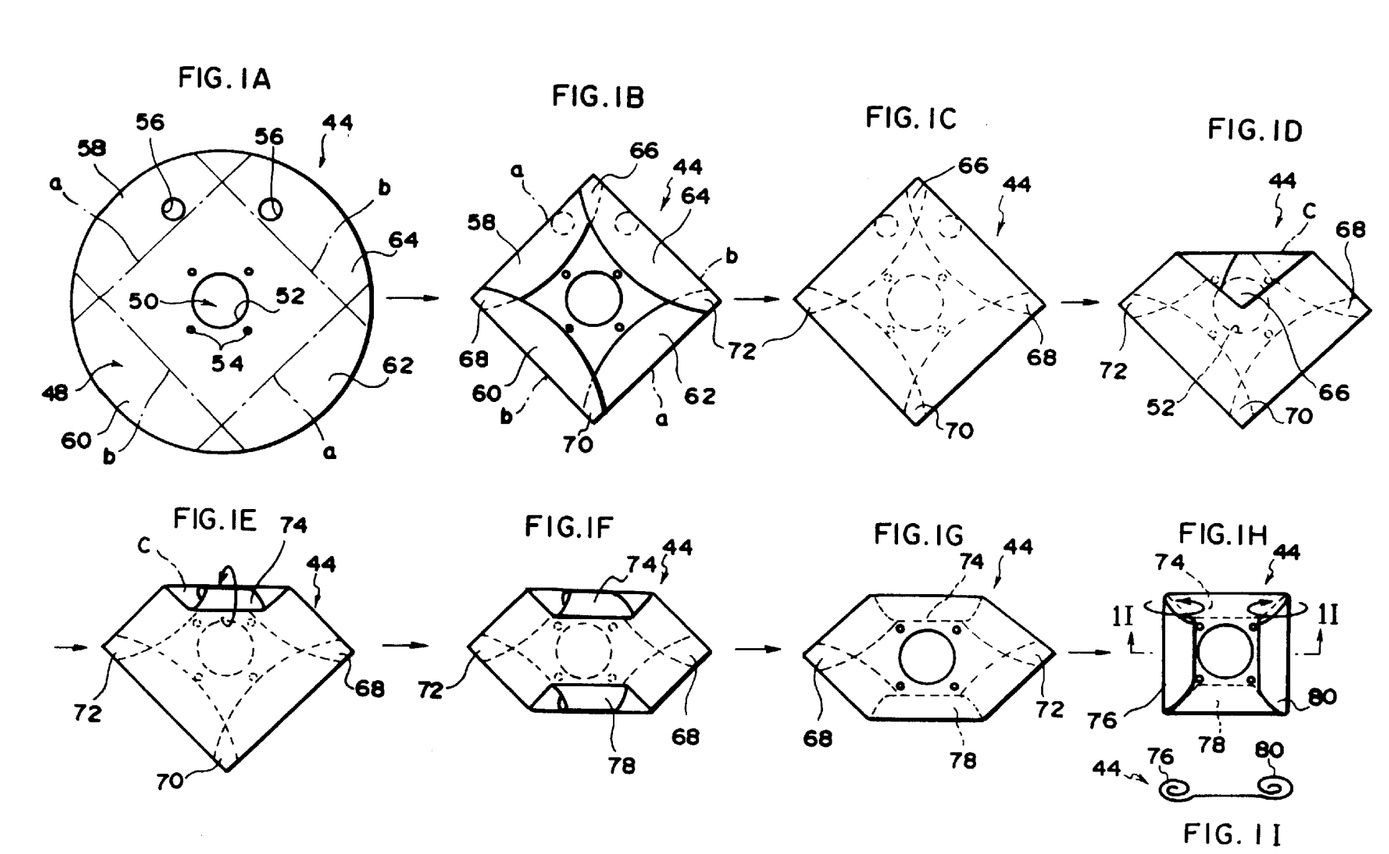

First, as shown in FIG. 1A, the bag 44, which is comprised of two pieces of base cloth 48 and 50 which are respectively cut into circular shapes and whose peripheral portions are sewn together, is set in a planarly laid-out state. The circular opening 52 for insertion of the upper case 28 of the above-described inflator 24 is formed in the central portion of one base cloth (the cloth located on the side of the bag 44 which is located away from the occupant in an assembled state) 48, and the bolt insertion holes 54 for insertion of the stud bolts projecting from the ring plate 46 are formed around the opening 52. Further, a pair of vent holes 56 for lowering the internal pressure of the bag at the time of contact with the occupant are formed on an upper edge side of the base cloth 48 in a plan view. It should be noted that this step corresponds to a "first step."

Next, as shown in FIG. 1B, four peripheral edge portions of the planarly laid-out bag 44 spaced apart at 90-degree intervals are folded toward the center of the bag (hereafter, these folded peripheral edge portions will be referred to as a first peripheral edge portion 58, a second peripheral edge portion 60, a third peripheral edge portion 62, and a fourth peripheral edge portion 64). Specifically, mutually opposing first and third peripheral edge portions 58 and 62 are first folded toward the center of the bag in the same direction (i.e., in the direction corresponding to the side away from the occupant in the state in which the bag 44 is mounted in the vehicle) by using folding lines a as folds. Then, the remaining second and fourth peripheral edge portions 60 and 64 are also folded toward the center of the bag in the same direction (i.e., in the direction corresponding to the side away from the occupant in the state in which the bag 44 is mounted in the vehicle) by using folding lines b as folds. As a result, the shape of the bag 44 in a plan view is set in a quadrangular shape (to be exact, a square shape). Incidentally, the step described above corresponds to a "second step."

Subsequently, as shown in FIG. 1C, the bag 44 set in the quadrangular shape in the plan view is reversed. It should be noted that the positional relationship of the bag 44 folded in the second step with respect to the steering wheel 12 in the state in which the bag 44 is mounted in the vehicle is indicated by the two-dotted dash lines in FIG. 3.

Next, as shown in FIG. 1D, a first corner portion 66 of the bag 44, which has been folded in the quadrangular shape and reversed, is folded back toward the center of the bag by using a folding line c as a fold. Then, as shown in FIG. 1E, the first corner portion 66 of the bag 44, which has been folded back by using the folding line c as the fold, is folded back into roll form toward the folding line c in the direction opposite to the previous folding direction. As a result, a first roll portion 74 is formed. Then, as shown in FIG. 1F, a third corner portion 70 which is located diagonally with respect to the first corner portion 66 is also folded and folded back into roll form in a similar manner. As a result, a third roll portion 78 which is parallel with the first roll portion 74 is formed. Then, as shown in FIG. 1G, the bag 44 in which the first and third roll portions 74 and 78 have been formed is reversed again. Then, as shown in FIG. 1H, a second corner portion 68 and a fourth corner portion 72 of the reversed bag 44 are also folded back into roll form in a similar manner. As a result, a second roll portion 76 and a fourth roll portion 80 which are arranged parallel to each other are formed (see the cross-sectional view shown in FIG. 1I). Consequently, the shape of the bag 44 in a plan view is set in a quadrangular shape (to be exact, a square shape; see FIG. 1H) which is smaller than the quadrangular shape (to be exact, the square shape; see FIG. 1B) formed in the above-described second step. Incidentally, the step described above corresponds to a "third step."

Next, a description will be given of the operation and advantages of this embodiment.

At the time of impact of a predetermined high load to the front of the vehicle (i.e., at the time of a sudden deceleration of the vehicle), the state of the sudden deceleration of the vehicle is detected by the sensor 42. For this reason, the unillustrated firing pin pierces the igniter 30 by an urging force, and ignites the same. As a result, a flame is propagated to the gas generating agent 34 via the fire propagating agent 32, and burns the gas generating agent 34. Consequently, a large volume of gas is generated, and after the gas is cooled by the coolants 40 and fragments are removed by the screens 38, the gas flows into the bag 44 through the gas ejection holes 36. Hence, the bag 44 is inflated, and when its inflationary pressure reaches a predetermined value, the top wall portion 18A of the wheel pad 18 is fractured along the thin-walled portions 20 and is unfolded. As a result, the bag 44 is inflated toward the occupant seated in the driver seat, and is interposed between the steering wheel 12 and the occupant.

Here, in this embodiment, since the bag 44 is folded in the above-described folding method, it is possible to obtain the following operation and advantages. Namely, in this embodiment, since the arrangement provided is such that the four peripheral edge portions 66 to 72 of the bag 44, whose shape in a plan view has been set in the quadrangular shape through the second step, are respectively folded into roll form independently in the third step, it is possible to completely avoid a situation in which, when a certain corner portion (e.g., the fourth corner portion 72) is folded into roll form, an end of a portion (the first roll portion 74 or the third roll portion 78) folded from an adjacent corner portion (i.e., the first corner portion 66 or the third corner portion 70) is folded in an overlapping manner. In other words, the bag 44 can be folded up without causing the portions (the first roll portion 74 to the fourth roll portion 80) folded from the first corner portion 66 to the fourth corner portion 72 to interfere with each other.

As a result, in accordance with this embodiment, it is possible to cancel the dependence (the characteristic that an ensuing folded portion cannot be unfolded unless one folded portion is unfolded) at the time when the gas flows into the bag 44 and deploys the bag 44 (i.e., at the time the bag 44 is unfolded), which has been the drawback of the conventional structure. Accordingly, with the bag 44 folded in the folding method in accordance with this embodiment, the first roll portion 74 to the fourth roll portion 80 are respectively unfolded concurrently and independently from the early stage of inflation. That is, in the early stage of inflation, the first roll portion 74 and the third roll portion 78 are unfolded concurrently in the vertical direction, while the second roll portion 76 and the fourth roll portion 80 are unfolded concurrently in the horizontal direction. Consequently, in accordance with this embodiment, the bag 44 can be set in an optimally deploying state in the early stage of inflation.

In addition, in accordance with this embodiment, as can be seen from FIGS. 1B, 1C, and the like, when the bag 44 folded through the first to third steps is fixed to the base plate 16, edges of the portions folded in the second step (the first peripheral edge portion 58 to the fourth peripheral edge portion 64) can be placed between an obverse quadrangular surface portion of the bag 44 and the base portion 16A of the base plate 16. For this reason, it becomes relatively difficult for the edges placed therebetween to unfold. Therefore, the shape of the bag 44 in the early stage of inflation becomes planar when viewed from the occupant side, so that the bag 44 can be set in an optimally deploying shape (i.e., deploying state) in this aspect as well.

Next, referring to FIGS. 4A to 4J', a description will be given of a second embodiment of the present invention.

Figure 4A:
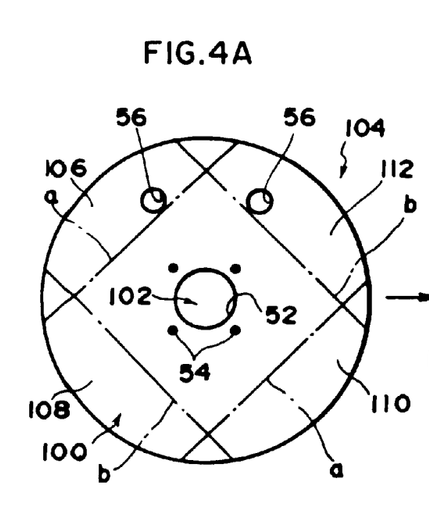

First, as shown in FIG. 4A, a bag 104, which is comprised of two pieces of base cloth 100 and 102 which are respectively cut into circular shapes and whose peripheral portions are sewn together, is set in a planarly laid-out state. It should be noted that this step corresponds to the "first step."

Figure 4B:
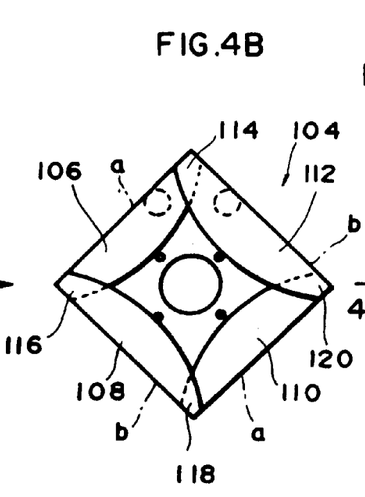

Next, as shown in FIG. 4B, four peripheral edge portions of the planarly laid-out bag 104 spaced apart at 90-degree intervals are folded toward the center of the bag. Specifically, mutually opposing first and third peripheral edge portions 106 and 110 are first folded toward the center of the bag in the same direction by using the folding lines a as folds. Then, remaining second and fourth peripheral edge portions 108 and 112 are also folded toward the center of the bag in the same direction by using the folding lines b as folds. As a result, the shape of the bag 104 in a plan view is set in a quadrangular shape (i.e., a square shape). Incidentally, the step described above corresponds to the "second step."

Figures 4C, 4D:
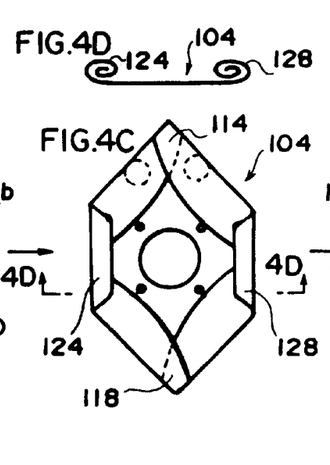
Figure 4E:
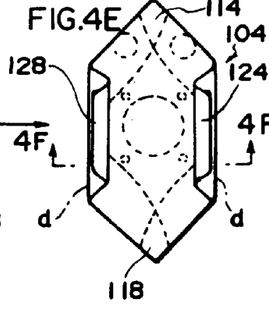
Figure 4F:
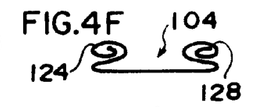
Figure 4G:
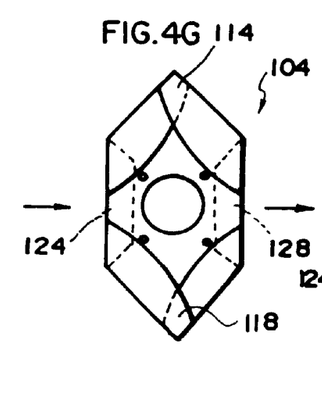
Figures 4H, 4I, 4J:
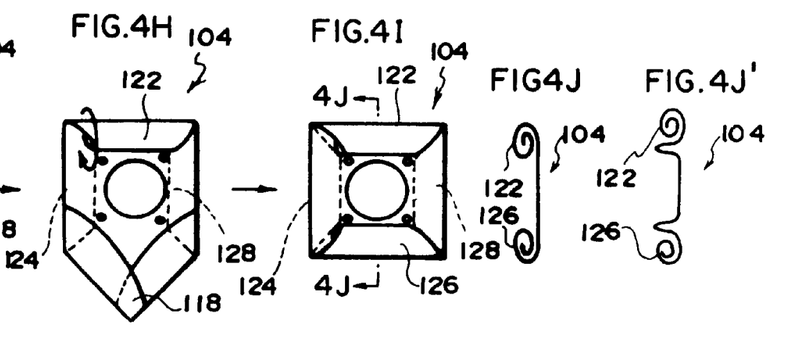

Subsequently, as shown in FIGS. 4C and 4D, a second corner portion 116 and a fourth corner portion 120 of the bag 104, which has been folded into the quadrangular shape in a plan view, are folded into roll form toward the center of the bag in mutually approaching directions. As a result, a second roll portion 124 and a fourth roll portion 128 which are parallel with each other are formed. Then, as shown in FIGS. 4E and 4F, the bag 104, in which the second roll portion 124 and the fourth roll portion 128 have been formed, is reversed, and the second roll portion 124 and the fourth roll portion 128 are folded back by using folding lines d as folds. Then, after the bag 104 is reversed again as shown in FIG. 4G, a first corner portion 114 is folded back toward the center of the bag as shown in FIG. 4H. As a result, a first roll portion 122 is formed in such a manner as to be perpendicular to the second roll portion 124 and the fourth roll portion 128. Then, a third corner portion 118 is also folded into roll form in a similar manner. Hence, a third roll portion 126 which is parallel with the first roll portion 122 is formed, as shown in FIGS. 4I and 4J. Consequently, the shape of the bag 104 in a plan view is set in a quadrangular shape (to be exact, a square shape; see FIG. 4I) which is smaller than the quadrangular shape (to be exact, the square shape; see FIG. 4B) formed in the above-described second step. It should be noted that when the first roll portion 122 and the third roll portion 126 are formed into shape, these portions may be each formed into a final shape having one pleat, as shown in FIG. 4J'. Incidentally, the step described above corresponds to the "third step."

Since the above-described folding method is common to that of the above-described first embodiment in that the four corner portions 114 to 120 of the bag 104 are respectively folded into roll form independently, the first to fourth roll portions 122 to 128 do not interfere with each other, so that the dependence at the time of deployment of the bag 104 can be canceled. Accordingly, the first roll portion 122 to the fourth roll portion 128 can be respectively unfolded concurrently in the vertical and horizontal directions from the early stage of inflation. Consequently, in accordance with this embodiment as well, the bag 104 can be set in an optimally deploying state in the early stage of inflation.

Next, referring to FIGS. 5A to 5G, a description will be given of a third embodiment of the present invention.

Figure 5A:
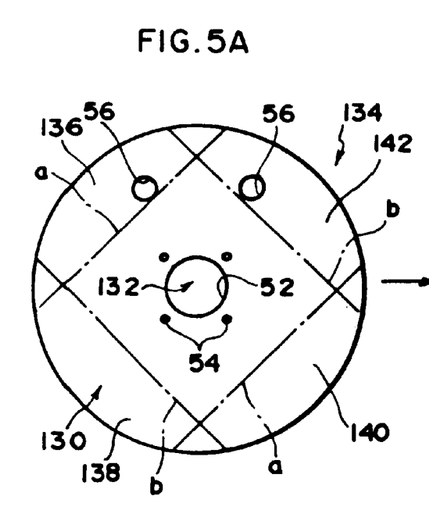

First, as shown in FIG. 5A, a bag 134, which is comprised of two pieces of base cloth 130 and 132 which are respectively cut into circular shapes and whose peripheral portions are sewn together, is set in a planarly laid-out state. It should be noted that this step corresponds to the "first step."

Figure 5B:
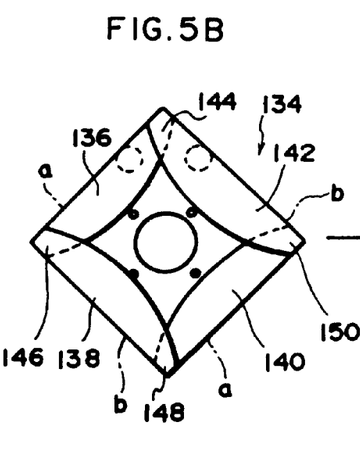

Next, as shown in FIG. 5B, four peripheral edge portions of the planarly laid-out bag 134 spaced apart at 90-degree intervals are folded toward the center of the bag. Specifically, mutually opposing first and third peripheral edge portions 136 and 140 are first folded toward the center of the bag in the same direction by using the folding lines a as folds. Then, remaining second and fourth peripheral edge portions 138 and 142 are folded toward the center of the bag in the same direction by using the folding lines b as folds. As a result, the shape of the bag 134 in a plan view is set in a quadrangular shape (to be exact, a square shape). Incidentally, the step described above corresponds to the "second step."

Figure 5C:
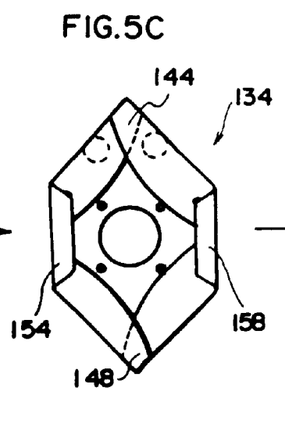
Figure 5D:
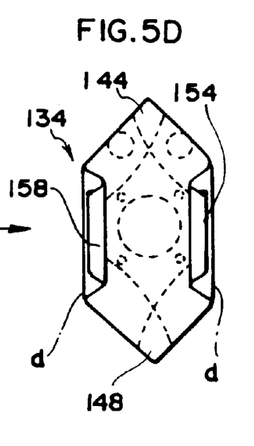
Figure 5E:
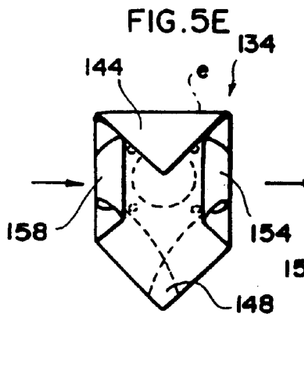
Figures 5F, 5G:
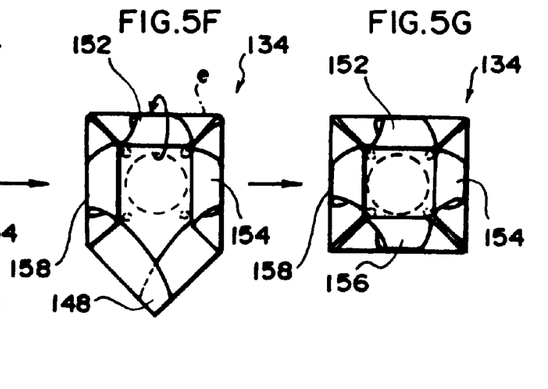

Subsequently, as shown in FIG. 5C, a second corner portion 146 and a fourth corner portion 150 of the bag 134, which has been folded into the quadrangular shape in a plan view, are folded into roll form toward the center of the bag in mutually approaching directions, thereby forming a second roll portion 154 and a fourth roll portion 158 which are parallel with each other. Then, as shown in FIG. 5D, the bag 134, in which the second roll portion 154 and the fourth roll portion 158 have been formed, is reversed, and the second roll portion 154 and the fourth roll portion 158 are folded back by using the folding lines d as folds. Then, as shown in FIG. 5E, a first corner portion 144 is folded toward the center of the bag by using a folding line e as a fold without reversing the bag 134. Then, as shown in FIG. 5F, a distal end portion of the folded first corner portion 144 is folded back into roll form toward the opposite side (i.e., toward the folding line e side). As a result, a first roll portion 152 is formed between end portions of the second roll portion 154 and the fourth roll portion 158. Then, a third corner portion 148 is also folded, and is then folded back into roll form in a similar manner. Hence, a third roll portion 156 which is parallel with the first roll portion 152 is formed. Consequently, the shape of the bag 134 in a plan view is set in a quadrangular shape (to be exact, a square shape; see FIG. 5G) which is smaller than the quadrangular shape (to be exact, the square shape; see FIG. 5B) formed in the above-described second step. Incidentally, the step described above corresponds to the "third step."

Since the above-described folding method is common to that of the above-described first embodiment in that the four corner portions 144 to 150 of the bag 134 are respectively folded into roll form independently, the first to fourth roll portions 152 to 158 do not interfere with each other, so that the dependence at the time of deployment of the bag 134 can be canceled. Accordingly, the first roll portion 152 to the fourth roll portion 158 can be respectively unfolded concurrently in the vertical and horizontal directions from the early stage of inflation. Consequently, in accordance with this embodiment as well, the bag 134 can be set in an optimally deploying state in the early stage of inflation.

Next, referring to FIGS. 6A to 6G, a description will be given of a fourth embodiment of the present invention.

Figure 6A:
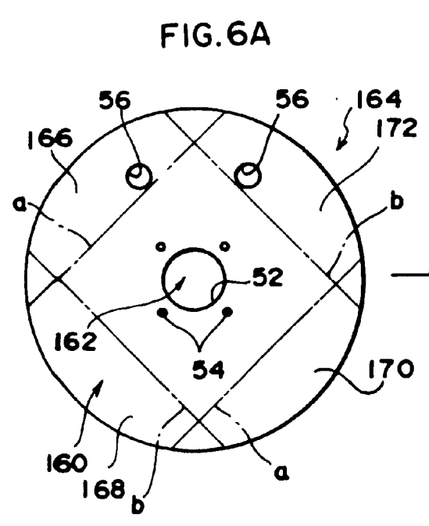

First, as shown in FIG. 6A, a bag 164, which is comprised of two pieces of base cloth 160 and 162 which are respectively cut into circular shapes and whose peripheral portions are sewn together, is set in a planarly laid-out state. It should be noted that this step corresponds to the "first step."

Figure 6B:
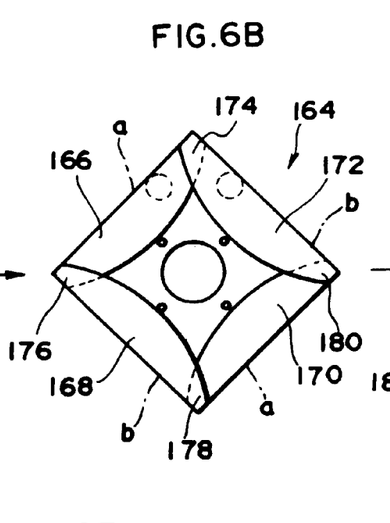

Next, as shown in FIG. 6B, four peripheral edge portions of the planarly laid-out bag 164 spaced apart at 90-degree intervals are folded toward the center of the bag. Specifically, mutually opposing first and third peripheral edge portions 166 and 170 are first folded toward the center of the bag in the same direction by using the folding lines a as folds. Then, remaining second and fourth peripheral edge portions 168 and 172 are folded toward the center of the bag in the same direction by using the folding lines b as folds. As a result, the shape of the bag 164 in a plan view is set in a quadrangular shape (to be exact, a square shape). Incidentally, the step described above corresponds to the "second step."

Figure 6C:
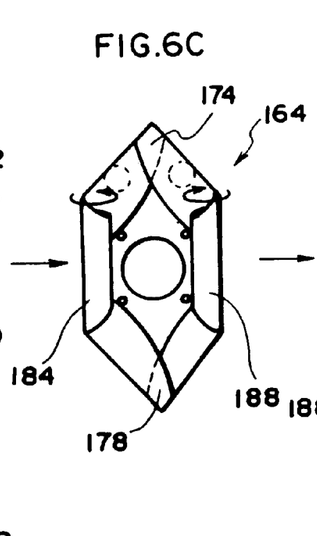
Figure 6D:
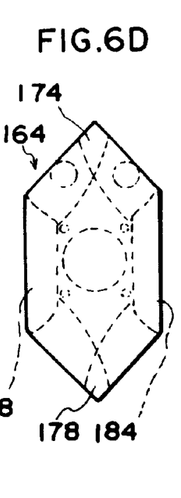
Figure 6E:
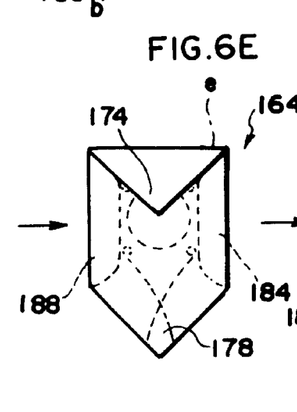
Figure 6F:
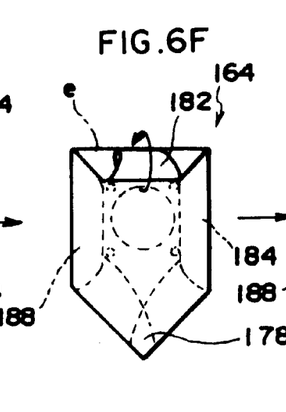
Figure 6G:
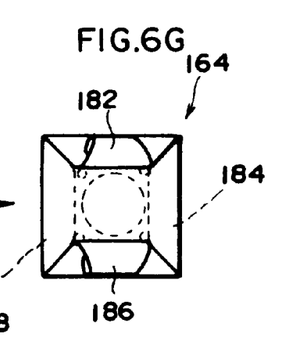

Subsequently, as shown in FIG. 6C, a second corner portion 176 and a fourth corner portion 180 of the bag 164, which has been folded into the quadrangular shape in a plan view, are folded into roll form toward the center of the bag in mutually approaching directions, thereby forming a second roll portion 184 and a fourth roll portion 188 which are parallel with each other. Then, as shown in FIG. 6D, the bag 164, in which the second roll portion 184 and the fourth roll portion 188 have been formed, is reversed as it is. Subsequently, as shown in FIG. 6E, a first corner portion 174 of the bag 164 is folded toward the center of the bag by using the folding line e as a fold. Then, as shown in FIG. 6F, a distal end portion of the folded first corner portion 174 is folded back into roll form toward the opposite side (i.e., toward the folding line e side). As a result, a first roll portion 182 is formed on the side opposite to the side where the second roll portion 184 and the fourth roll portion 188 have been formed. Then, a third corner portion 178 is also folded, and is then folded back into roll form in a similar manner. Hence, a third roll portion 186 which is parallel with the first roll portion 182 is formed. Consequently, the shape of the bag 164 in a plan view is set in a quadrangular shape (to be exact, a square shape; see FIG. 6G) which is smaller than the quadrangular shape (to be exact, the square shape; see FIG. 6B) formed in the above-described second step. Incidentally, the step described above corresponds to the "third step."

Since the above-described folding method is common to that of the above-described first embodiment in that the four corner portions 174 to 180 of the bag 164 are respectively folded into roll form independently, the first to fourth roll portions 182 to 188 do not interfere with each other, so that the dependence at the time of deployment of the bag 164 can be canceled. Accordingly, the first roll portion 182 to the fourth roll portion 188 can be respectively unfolded concurrently in the vertical and horizontal directions from the early stage of inflation. Consequently, in accordance with this embodiment as well, the bag 164 can be set in an optimally deploying state in the early stage of inflation.

Next, referring to FIGS. 7A to 7D, a description will be given of a fifth embodiment of the present invention.

Figure 7A:
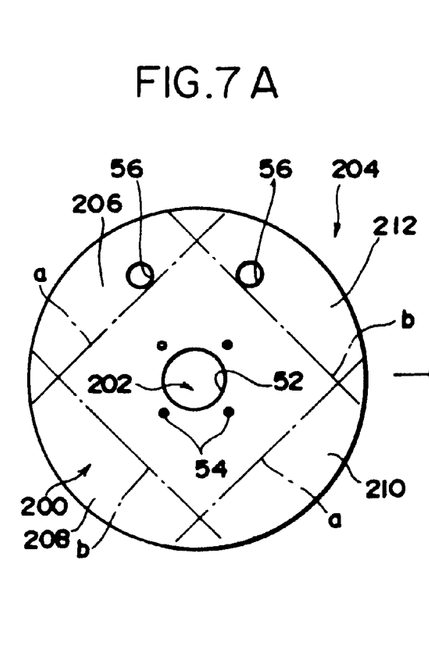

First, as shown in FIG. 7A, a bag 204, which is comprised of two pieces of base cloth 200 and 202 which are respectively cut into circular shapes and whose peripheral portions are sewn together, is set in a planarly laid-out state. It should be noted that this step corresponds to the "first step."

Figure 7B:
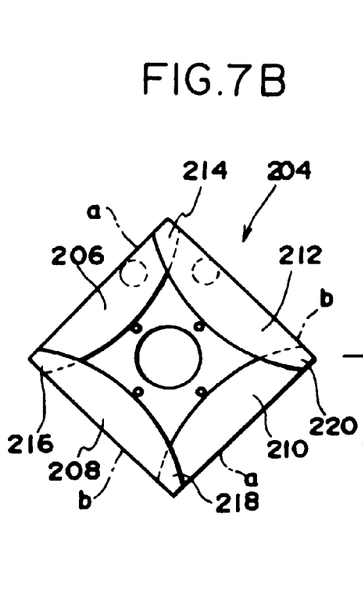

Next, as shown in FIG. 7B, four peripheral edge portions of the planarly laid-out bag 204 spaced apart at 90-degree intervals are folded toward the center of the bag. Specifically, mutually opposing first and third peripheral edge portions 206 and 210 are first folded toward the center of the bag in the same direction by using the folding lines a as folds. Then, remaining second and fourth peripheral edge portions 208 and 212 are folded toward the center of the bag in the same direction by using the folding lines b as folds. As a result, the shape of the bag 204 in a plan view is set in a quadrangular shape (to be exact, a square shape). Incidentally, the step described above corresponds to the "second step."

Figure 7C:
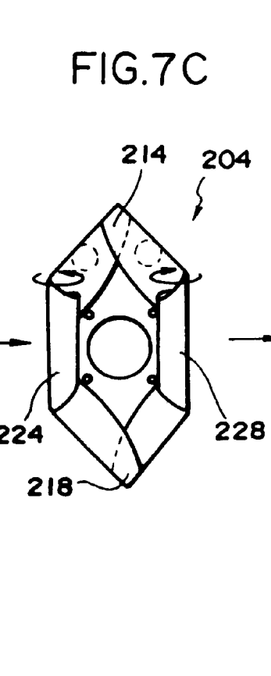
Figure 7D:
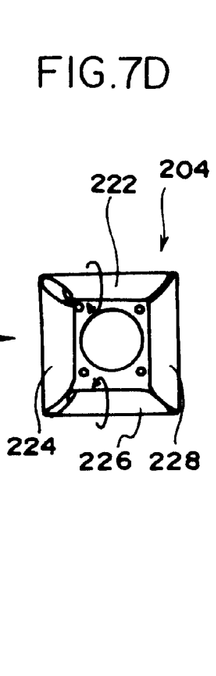

Subsequently, as shown in FIG. 7C, a second corner portion 216 and a fourth corner portion 220 of the bag 204, which has been folded into the quadrangular shape in a plan view, are folded into roll form toward the center of the bag mutually approaching directions, thereby forming a second roll portion 224 and a fourth roll portion 228 which are parallel with each other. Then, as shown in FIG. 7D, a first corner portion 214 and a third corner portion 218 are also folded into roll form toward the center of the bag in mutually approaching directions in a similar manner. As a result, a first roll portion 222 and a third roll portion 226 which are parallel with each other are formed between end portions of the second roll portion 224 and the fourth roll portion 228. Consequently, the shape of the bag 204 in a plan view is set in a quadrangular shape (to be exact, a square shape; see FIG. 7D) which is smaller than the quadrangular shape (to be exact, the square shape; see FIG. 7B) formed in the above-described second step. Incidentally, the step described above corresponds to the "third step."

Since the above-described folding method is common to that of the above-described first embodiment in that the four corner portions 214 to 220 of the bag 204 are respectively folded into roll form independently, the first to fourth roll portions 222 to 228 do not interfere with each other, so that the dependence at the time of deployment of the bag 204 can be canceled. Accordingly, the first roll portion 222 to the fourth roll portion 228 can be respectively unfolded concurrently in the vertical and horizontal directions from the early stage of inflation. Consequently, in accordance with this embodiment as well, the bag 204 can be set in an optimally deploying state in the early stage of inflation.

Although, in the above-described first embodiment, the first to fourth corner portions 66 to 72 of the bag 44 are respectively folded into roll form, the present invention is not limited to the same, and the first to fourth corner portions 66 to 72 may be respectively folded into the shape of bellows, or roll folding and bellows folding may be combined. In short, it suffices insofar as the arrangement provided is such that the first to fourth corner portions 66 to 72 are respectively folded a number of times independently. Also, the same applies to the other embodiments.

In addition, although, in the above-described first embodiment, the first to fourth roll portions 74 to 80 are folded up without interfering with each other, the first to fourth corner portions 66 to 72 may be folded up in such a manner as to interfere with each other slightly if the interference is of such a measure as not to cause resistance when the corner portions 66 to 72 are unfolded concurrently and independently. For example, if the folding line c of the first corner portion 66 is set to a position closer to the opening 52, when the corner portions are folded into roll form so as to form the second and fourth roll portions 76 and 80 in the final stage, end portions of the first and third roll portions 74 and 78 which were formed earlier are slightly tucked in in the final roll folding stage. However, such an extent of tucking in does not affect the operation and advantages obtained from the present invention. Accordingly, such an extent of mutual interference is allowed, and is covered in the category of the technological concept of the present invention described in the first embodiment. Also, the same applies to the other embodiments.

Further, although, in the above-described first embodiment, all the first to fourth peripheral edge portions 58 to 64 are folded in the same direction, the present invention is not limited to the same. For example, the direction in which the first and third peripheral edge portions 58 and 62 are folded and the direction in which the second and fourth peripheral edge portions 60 and 64 are folded may be made different, and it suffices if the shape of the bag in a plan view becomes quadrangular as a result of folding toward the center of the bag the four peripheral edge portions of the bag 44 spaced apart at 90-degree intervals from the planarly laid-out state. Also, the same applies to the other embodiments.

What is claimed is:

1. A method of folding a bag for an air bag apparatus which is accommodated in a folded state in an apparatus main body, and is deployed and inflated toward a vehicle occupant as an ejected gas flows into said bag on impact of a predetermined high load to a frontal portion of a vehicle, comprising:

a first step of planarly laying out said bag including two pieces of base cloth which are respectively cut into circular shapes and whose peripheral portions are secured to each other, a first piece of the base cloth of the bag constituting a first side of the bag facing away from the vehicle occupant when the bag is mounted in the apparatus main body, a second piece of the base cloth of the bag constituting a second side opposite from the first side and facing toward the vehicle occupant when the bag is mounted in the apparatus main body;

a second step of folding in a first direction toward a center of the first side of said bag four peripheral edge portions of said bag laid out planarly in the first step, such that the shape of said bag in a plan view becomes a quadrangular shape; and a third step of folding a plurality of times four corner portions formed by folding said bag in the second step, such that the shape of said bag in a plan view becomes a quadrangular shape which is smaller than said quadrangular shape.

2. The method of folding a bag for an air bag apparatus according to claim 1, wherein, in the second step, the peripheral edge portions are folded in an identical direction.

3. The method of folding an airbag apparatus according to claim 2, wherein, in the third step, the four corner portions are folded to have a roll form portion.

4. The method of folding a bag for an air bag apparatus according to claim 3, wherein, in the third step, the four corner portions are folded such that a direction in which each of the four corner portions is folded is different from a direction in which the corner portion adjacent thereto is folded.

5. The method of folding a bag for an air bag apparatus according to claim 3, wherein, in the third step, the four corner portions are folded such that directions in which all the four corner portions are folded become identical.

6. The method of folding a bag for an air bag apparatus according to claim 4, wherein, in the third step, of the four corner portions, at least two of the corner portions which are located diagonally are folded in mutually approaching directions.

7. The method of folding a bag for an air bag apparatus according to claim 4, wherein, in the third step, after at least two of the four corner portions which are located diagonally are folded at folding lines in a folding direction toward the center of said bag, the remaining corner portions are folded in a direction opposite to the folded direction.

8. The method of folding a bag for an air bag apparatus according to claim 5, wherein, in the third step, of the four corner portions, at least two of the corner portions which are located diagonally are folded in mutually approaching directions.

9. The method of folding a bag for an air bag apparatus according to claim 5, wherein, in the third step, after at least two of the four corner portions which are located diagonally are folded at folding lines in a folding direction toward the center of said bag, the remaining corner portions are folded in a direction opposite to the folded direction.

10. An air bag apparatus comprising:

a bag folded in the folding method according to claim 1.

11. The air bag apparatus according to claim 10, wherein the peripheral edge portions of said bag are folded in an identical direction.

12. The air bag apparatus according to claim 11, wherein said air bag is provided such that the four corner portions are folded to have a roll form portion.

13. The air bag apparatus according to claim 12, wherein the four corner portions of said bag are folded such that a direction in which each of the four corner portions is folded is different from a direction in which the corner portion adjacent thereto is folded.

14. The air bag apparatus according to claim 12, wherein the four corner portions of said bag are folded such that directions in which all the four corner portions are folded become identical.

15. The air bag apparatus according to claim 13, wherein, of the four corner portions of said bag, at least two of the corner portions which are located diagonally are folded in mutually approaching directions.

16. The air bag apparatus according to claim 13, wherein after at least two of the four corner portions which are located diagonally are folded at folding lines in a folding direction toward the center of said bag, the remaining corner portions are folded in a direction opposite to the folded direction.

17. The air bag apparatus according to claim 14, wherein, of the four corner portions of said bag, at least two of the corner portions which are located diagonally are folded in mutually approaching directions.

18. The air bag apparatus according to claim 14, wherein after at least two of the four corner portions which are located diagonally are folded at folding lines in a folding direction toward the center of said bag, the remaining corner portions are folded in a direction opposite to the folded direction.

19. The method of folding a bag for an air bag apparatus according to claim 1, wherein, in the second step, the peripheral edge portions are folded in a direction away from the vehicle occupant in a state in which said bag is mounted in the vehicle.

20. The method of folding a bag for an air bag apparatus according to claim 2, wherein, in the second step, the peripheral edge portions are folded in a direction away from the vehicle occupant in a state in which said bag is mounted in the vehicle.

21. The method of folding a bag for an air bag apparatus according to claim 1, wherein, in the third step, two of the corner portions are folded in a second direction toward a center of the second side of the bag.

22. The air bag apparatus according to claim 10, wherein two of the corner portions are folded in a second direction toward a center of the second side of the bag.

23. The method of folding a bag for an air bag apparatus according to claim 1, wherein said second step further includes a step of mounting said bag having four corner portions formed by folding in the first direction toward a center of the first side of said bag the four peripheral edge portions of said bag, on the apparatus main body, such that one pair of the corner portions located on one diagonal line of said bag is disposed in the horizontal direction and the other pair of the corner portions located on the other diagonal line of said bag is disposed in the vertical direction.

24. The air bag apparatus according to claim 10, wherein said second step further includes a step of mounting said bag having four corner portions formed by folding in the first direction toward a center of the first side of said bag the four peripheral edge portions of said bag, on the apparatus main body, such that one pair of the corner portions located on one diagonal line of said bag is disposed in the horizontal direction and the other pair of the corner portions located on the other diagonal line of said bag is disposed in the vertical direction.

* * * * *

UNITED STATES PATENT AND TRADEMARK OFFICE
CERTIFICATE OF CORRECTION

PATENT NO.   : 6,092,839
DATED        : July 25, 2000
INVENTOR(S)  : Makoto Nagano Page 1 of 1

It is certified that error appears in the above-identified patent and that said Letters Patent is hereby corrected as shown below:

<u>Title page, column 1,</u>
Item [56], US PATENT DOCUMENTS, please add the following cited references:
--  5,613,707   3/1997   Berti
    5,899,495   5/1999   Yamamoto et al.
    5,425,551   6/1995   Hawthorn
    5,615,915   4/1997   Magoteaux   --

Signed and Sealed this

Thirteenth Day of November, 2001

Attest:

NICHOLAS P. GODICI
Attesting Officer
Acting Director of the United States Patent and Trademark Office